United States Patent
Reuss et al.

(10) Patent No.: US 7,643,931 B2
(45) Date of Patent: Jan. 5, 2010

(54) COMBUSTION CONTROL METHOD FOR A DIRECT-INJECTION CONTROLLED AUTO-IGNITION COMBUSTION ENGINE

(75) Inventors: David L. Reuss, Huntington Woods, MI (US); Tang-Wei Kuo, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/110,567

(22) Filed: Apr. 28, 2008

(65) Prior Publication Data
US 2008/0201063 A1    Aug. 21, 2008

Related U.S. Application Data

(62) Division of application No. 11/470,037, filed on Sep. 5, 2006, now Pat. No. 7,398,758.

(60) Provisional application No. 60/730,186, filed on Oct. 25, 2005.

(51) Int. Cl.
F02D 45/00    (2006.01)
(52) U.S. Cl. .................. 701/103; 123/143 B; 123/295
(58) Field of Classification Search ......... 701/101–105; 123/295, 298, 299, 304–306, 143 B, 435, 123/575
See application file for complete search history.

(56) References Cited

U.S. PATENT DOCUMENTS

| | | | |
|---|---|---|---|
| 4,330,732 A | 5/1982 | Lowther et al. | |
| 4,332,223 A * | 6/1982 | Dalton | 123/253 |
| 4,996,967 A | 3/1991 | Rosswurm et al. | |
| 5,148,084 A | 9/1992 | Frus | |
| 5,568,801 A * | 10/1996 | Paterson et al. | 123/598 |
| 5,904,127 A | 5/1999 | Kemmler et al. | |
| 5,967,122 A | 10/1999 | Muntzer et al. | |
| 6,032,640 A | 3/2000 | Evans | |
| 6,155,212 A | 12/2000 | McAlister | |
| 6,796,278 B2 * | 9/2004 | Ryan, III | 123/143 B |
| 6,971,365 B1 | 12/2005 | Najt et al. | |
| 6,994,072 B2 | 2/2006 | Kuo et al. | |
| 6,994,073 B2 | 2/2006 | Tozzi et al. | |
| 7,367,307 B2 * | 5/2008 | Lampard | 123/288 |
| 2004/0123822 A1 | 7/2004 | Fuerhapter | |
| 2004/0220720 A1 | 11/2004 | Noda | |
| 2005/0211219 A1 | 9/2005 | Strom et al. | |
| 2006/0016423 A1 | 1/2006 | Kuo et al. | |
| 2007/0137611 A1 | 6/2007 | Yu et al. | |

OTHER PUBLICATIONS

International Search Report for PCT/US 06/38359 dated Mar. 8, 2007 corresponding to the parent application (U.S. Appl. No. 11/470,037) of this Divisional application.

(Continued)

*Primary Examiner*—Stephen K Cronin
*Assistant Examiner*—Johnny H Hoang

(57) ABSTRACT

A powertrain and a control method therefore are provided wherein ignition of a combustible charge in a combustion chamber of a controlled auto-ignition internal combustion engine equipped with in-cylinder fuel-injection and a spark ignition device is controlled. A spark-discharge plasma channel is generated between the electrodes of the spark ignition device, and the combustible charge is ignited. The spark-discharge plasma channel is moved toward and entrained by the combustible charge, effective to advance phasing of controlled auto-ignition combustion.

9 Claims, 8 Drawing Sheets

OTHER PUBLICATIONS

Dr. Jurgen Fischer, Methods for the Development of the Spray Guided BMW DI Combustion Engine, 7th Int'l Symp. on IC Diagnostics, May 2006, pp. 413-423, Baden Baden Kurhaus, DE.

D. Zimmermann, Inflammation of Stratified Mixture In Spray Guided DI Gasoline Engines, 7th Int'l Symp. on IC Diagnostics, May 2006, pp. 107-122, Baden Baden Kurhaus, DE.

S. Pischinger, How Heat Losses to the Spark Plug Elecrtrodes Affect Flame Kernel Development in an SI-Engine; 1990, pp. 1-20, SAE Paper 900021, SAE Warrendale, PA, USA.

* cited by examiner

COMBUSTION CONTROL METHOD FOR A DIRECT-INJECTION CONTROLLED AUTO-IGNITION COMBUSTION ENGINE

CROSS REFERENCE TO RELATED APPLICATIONS

This application is a divisional of U.S. patent application Ser. No. 11/470,037, filed Sep. 5, 2006 now U.S. Pat. No. 7,398,758, which is hereby incorporated by reference in its entirety. The aforementioned non-provisional application claims the benefit of U.S. Provisional Application No. 60/730,186, filed Oct. 25, 2005, which is hereby incorporated by reference in its entirety.

TECHNICAL FIELD

This disclosure pertains generally to internal combustion engine control systems, and more specifically to a method to control combustion in direct-injection, controlled auto-ignition combustion engines.

BACKGROUND

The statements in this section merely provide background information related to the present disclosure and may not constitute prior art.

One method of controlling combustion in a conventional internal combustion engine is with spark-ignition leading to flame propagation, referred to homogeneous-charge spark-ignition (SI). It is well known in conventional homogeneous-charge spark-ignition (SI) engines that cyclic variability of the ignition process is strongly affected by in-cylinder charge motion during spark discharge. For example, it has been demonstrated that better ignition characteristics resulted by convecting an early flame-kernel away from each spark electrode to minimize spark energy loss. In particular, in-cylinder charge motion, e.g., swirl and tumble components, in conjunction with combustion chamber design have been used to manipulate a spark-discharge plasma channel away from the spark-plug electrodes. This action improves ignitability of both stoichiometric and dilute air/fuel mixtures in both homogeneous-charge and stratified-charge spark-ignition gasoline engines.

The importance of using spark-ignition for combustion phasing control in direct-injection controlled auto-ignition combustion engines has also been demonstrated. Use of spark-ignition to control combustion phasing in a direct-injection gasoline auto-ignition combustion engine operating at light load and idle, and to enable cold start using a conventional compression ratio has been described in U.S. Pat. No. 6,971,365 B1, entitled AUTO-IGNITION GASOLINE ENGINE COMBUSTION CHAMBER AND METHOD, issued to Najt, et al., on Dec. 6, 2005. Use of fuel injection and spark-ignition strategies to extend the mid-load operation limit of a gasoline direct-injection controlled auto-ignition combustion engine has been described in U.S. Pat. No. 6,994,072 B2, entitled METHOD FOR MID LOAD OPERATION OF AUTO-IGNITION COMBUSTION, issued to Kuo, et al., on Feb. 7, 2006. There are many geometrically constrained design limitations for optimal engine operation which affect the ability of the spark-discharge plasma channel to be located at an ignitable region of the fuel-air mixture; these included relative position between the spark plug, the fuel injector, combustion-chamber geometry, and piston-bowl geometry.

There is a need for a powertrain control system, comprising either a homogeneous- or stratified-charge, controlled auto-ignition internal combustion engine, wherein ignition of a combustible charge in a combustion chamber is controlled.

SUMMARY

A powertrain includes an internal combustion engine having a combustion chamber with an in-cylinder fuel injector and a spark-ignition device. The engine is operative in a controlled auto-ignition combustion mode. The powertrain further includes a control module configured to execute a computer program to generate a combustible charge and control ignition thereof. The computer program includes code to control the spark ignition device to generate a spark-discharge plasma channel between cathode and anode electrodes of the spark ignition device, and code to actuate the in-cylinder fuel injector to generate the combustible charge in the combustion chamber effective to move the spark-discharge plasma channel toward the combustible charge to advance phasing of auto-ignition of the combustible charge.

BRIEF DESCRIPTION OF THE DRAWINGS

One or more embodiments will now be described, by way of example, with reference to the accompanying drawings, in which.

DETAILED DESCRIPTION

Figure 1:
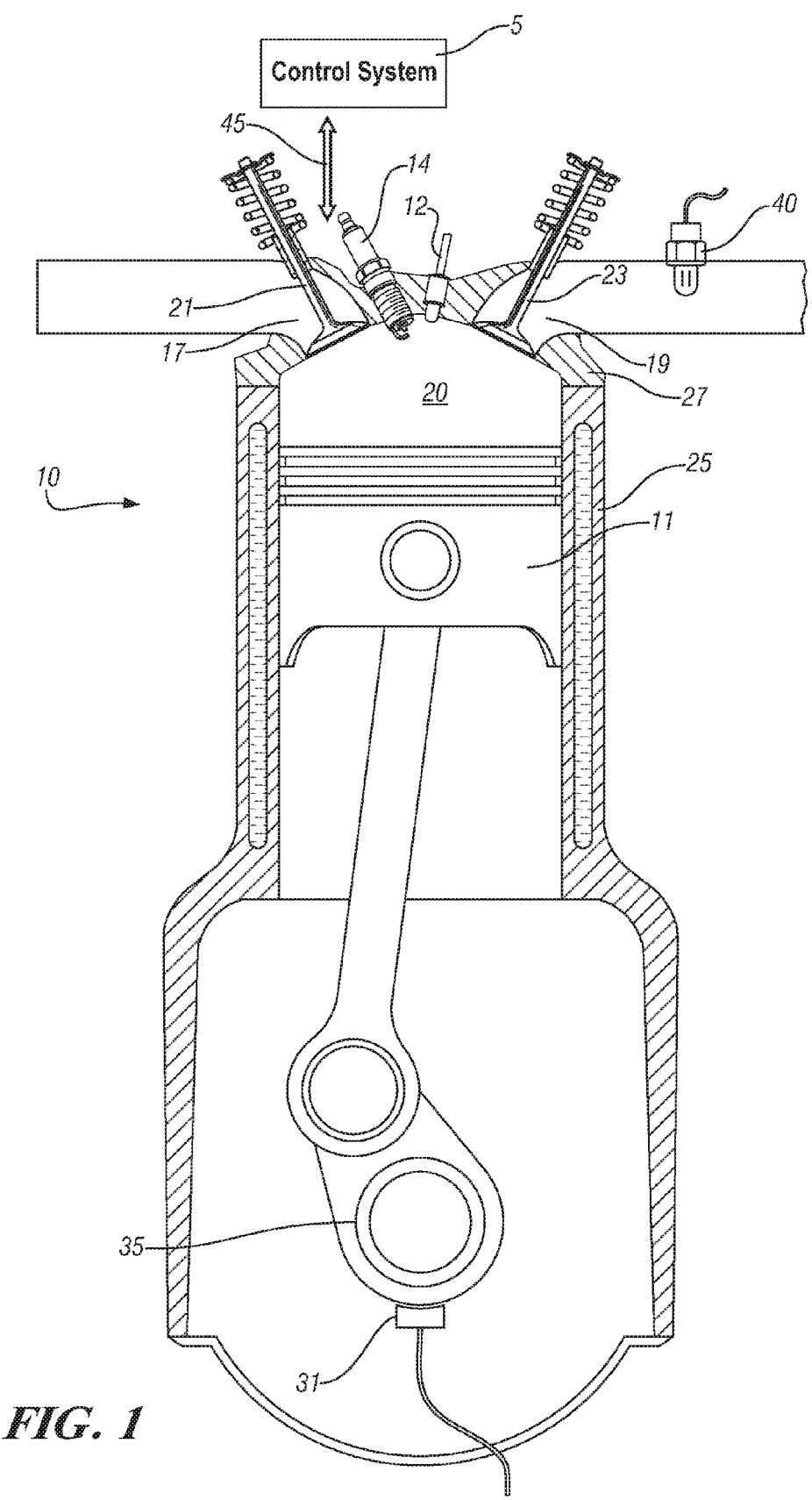
FIGS. 1, 2, and 3A-3D are schematic illustrations of an internal combustion engine, in accordance with the present disclosure; and, FIGS. 4, 5, and 6 are datagraphs, in accordance with the present disclosure.

Referring now to the drawings, wherein the depictions are for the purpose of illustrating certain exemplary embodiments only and not for the purpose of limiting the same, FIG. 1 depicts a powertrain, comprising an internal combustion engine 10 and control system 5 which has been constructed in accordance with one embodiment. The engine 10 preferably comprises a gasoline direct-fuel injection, spark-ignited, four-stroke internal combustion engine operable in a controlled auto-ignition process, i.e., a homogeneous-charge, compression-ignition ('HCCI') engine. It is understood that the descriptions herein are applicable to other engine configurations, e.g., engines configured to operate in a stratified-charge mode.

The exemplary engine comprises a plurality of variable volume combustion chambers 20, each defined by a closed-end cylinder formed in an engine block 25. A moveable piston 11 defines, with walls of the cylinder, the variable volume combustion chamber 20. A rotatable crankshaft 35 is connected by a connecting rod to each piston 11, which reciprocates in the cylinder during ongoing operation. A cylinder head 27 is sealably attached to the block 25 at an end thereof distal from the crankshaft 35, and forms the combustion chamber 20 with the cylinder walls and the piston 11. The cylinder head 27 provides a structure for intake port 17, exhaust port 19, intake valve(s) 21, exhaust valve(s) 23, in-cylinder fuel injector 12, and spark plug 14. The fuel injector 12 comprises a known device which is fluidly connected to a pressurized fuel supply system to receive fuel, is operative to directly inject or spray the pressurized fuel into the combustion chamber 20 periodically during ongoing operation of the engine. Actuation of the fuel injector 12, and other actuators described herein, is controlled by an electronic engine control module ('ECM'), which is an element of the control system 5. Spark plug 14 comprises a known device operative to ignite an air/fuel mixture formed in the combustion chamber 20. The spark plug includes an anode electrode 15 and a cathode electrode 16, wherein a spark plug gap is formed therebetween. Requisite ignition energy is delivered to the cathode electrode 16 of the spark plug 14 for discharge across the spark plug gap, at appropriate times, from an ignition module controlled by the ECM. The intake port 17 channels air to the combustion chamber. Flow of air into the combustion chamber 20 is controlled by one or more intake valves 21, operatively controlled by a valve actuation device such as a camshaft (not shown). Combusted (burned) gases flow from the combustion chamber 20 via the exhaust port 19, with the flow of combusted gases through the exhaust port controlled by one or more exhaust valves 23 operatively controlled by a valve actuation device such as a second camshaft (not shown). Specific details of a control scheme to control opening and closing of the valves are not detailed, but it is understood that various valve control mechanisms and schemes, such as variable cam phasing and variable valve actuation, fall within the purview of the disclosure. Other generally known aspects of engine and combustion control are not detailed herein.

As previously described, the ECM is preferably an element of the overall control system 5 comprising a distributed control module architecture operative to provide coordinated powertrain system control. The ECM synthesizes pertinent information and inputs from sensing devices, including a crank sensor 31 and an exhaust gas sensor 40, and executes algorithms to control operation of various actuators, e.g. the fuel injector 12 and the ignition module, to achieve control targets, including such parameters as fuel economy, emissions, performance, driveability, and protection of hardware. The ECM is preferably a general-purpose digital computer generally comprising a microprocessor or central processing unit, storage mediums comprising read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning and buffer circuitry. A set of control algorithms, comprising resident program instructions and calibrations, is stored in ROM and executed to provide the respective functions. Algorithms are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Referring now to FIGS. 2 and 3A-3D, a method for controlling ignition of a combustible charge 60 in the combustion chamber 20 of the aforementioned engine 10 is illustrated. The method, preferably including at least one algorithm executed in the ECM, comprises generating a spark-discharge plasma channel 50 between the electrodes of the spark ignition device, and generating the combustible charge 60 in the combustion chamber 20 through actuation of the fuel injector 12. The spark-discharge plasma channel 50 formed between the cathode electrode 16 and anode electrode 15 comprises a high-temperature ionized gas column. The spark-discharge plasma channel is moved and entrained in the combustible charge effective to advance phasing of controlled auto-ignition of the combustible charge, relative to rotation of the crank angle. The combustible charge 60 comprises a mixture of air, fuel and residual gases captured in the combustion chamber during a compression phase of the four-stroke engine. Generating the combustible charge in the combustion chamber comprises selectively controlling fuel injection timing relative to piston position to generate fuel-spray-induced charge motion in the combustion chamber to entrain the spark-discharge plasma channel, including controlling timing and targeting of the in-cylinder fuel injection. It further comprises controlling magnitude and timing of openings of intake and exhaust valves to the combustion chamber to control in-cylinder charge motion.

The in-cylinder charge motion is defined herein as velocity and momentum of in-cylinder gases comprising the in-cylinder charge. Constituents of the in-cylinder charge include fresh intake air ingested during an intake stroke, any residual-gas fraction, and, directly injected fuel. The residual gas is defined as gas trapped from a previous engine cycle, or gas ingested from the exhaust during the intake stroke due to valve overlap or external exhaust gas recirculation. The velocity and momentum of the in-cylinder charge motion is preferably controllable with reference to flow-control parameters, including: the fresh intake air ingested through the intake valves, the residual gas flow, the injected fuel, and the shape and design of the combustion-chamber shape including the piston top, as well as interaction of these parameters during intake and compression strokes.

The velocity and momentum of the in-cylinder charge motion, and the associated flow control parameters are affected various combustion chamber design and operating factors. These factors comprise geometric design and shape of the combustion chamber and any bowl at the top of each piston, placement of the fuel injector in the combustion chamber; quantity and location of intake and exhaust valves, location of the spark plug; and, timing and magnitude of openings and closings of the intake and exhaust valves. Combustion phasing is defined herein as the timing, in crank-angle degrees, at which 50 percent of the mass of the combustible charge is burned ('ca50'), typically after top-dead-center ('aTDC').

Figure 2:
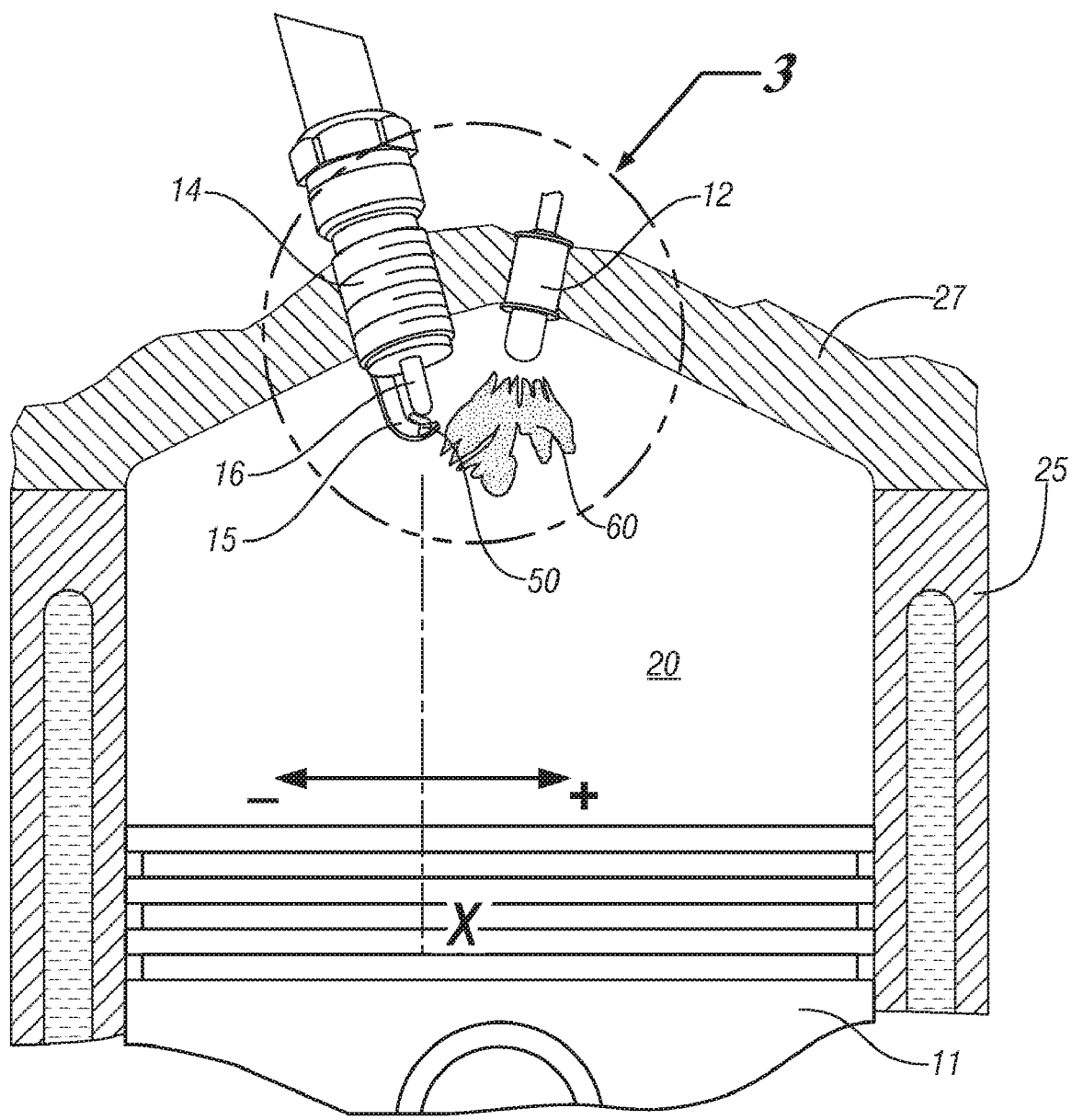
Figure 3A:
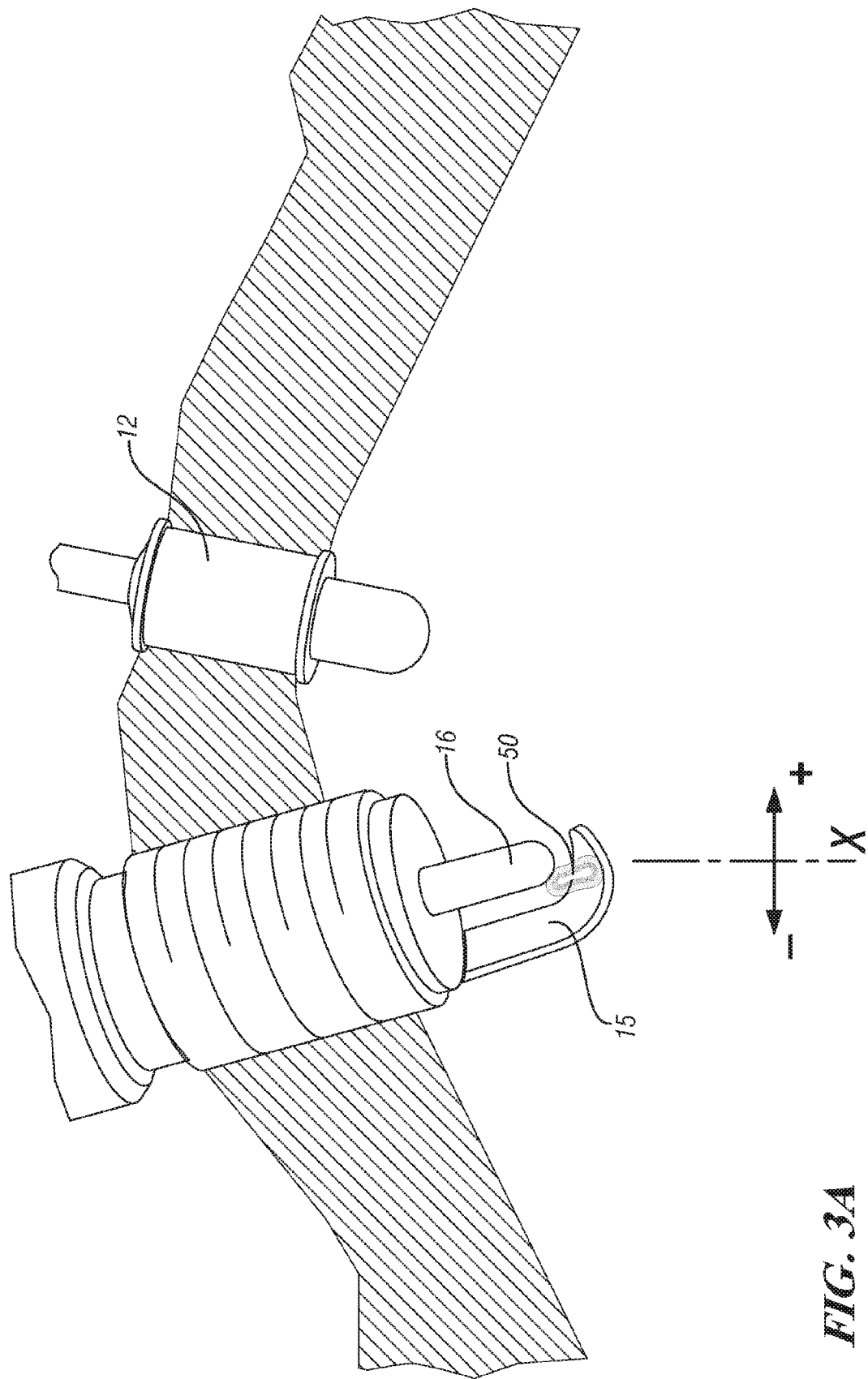
Figure 3B:
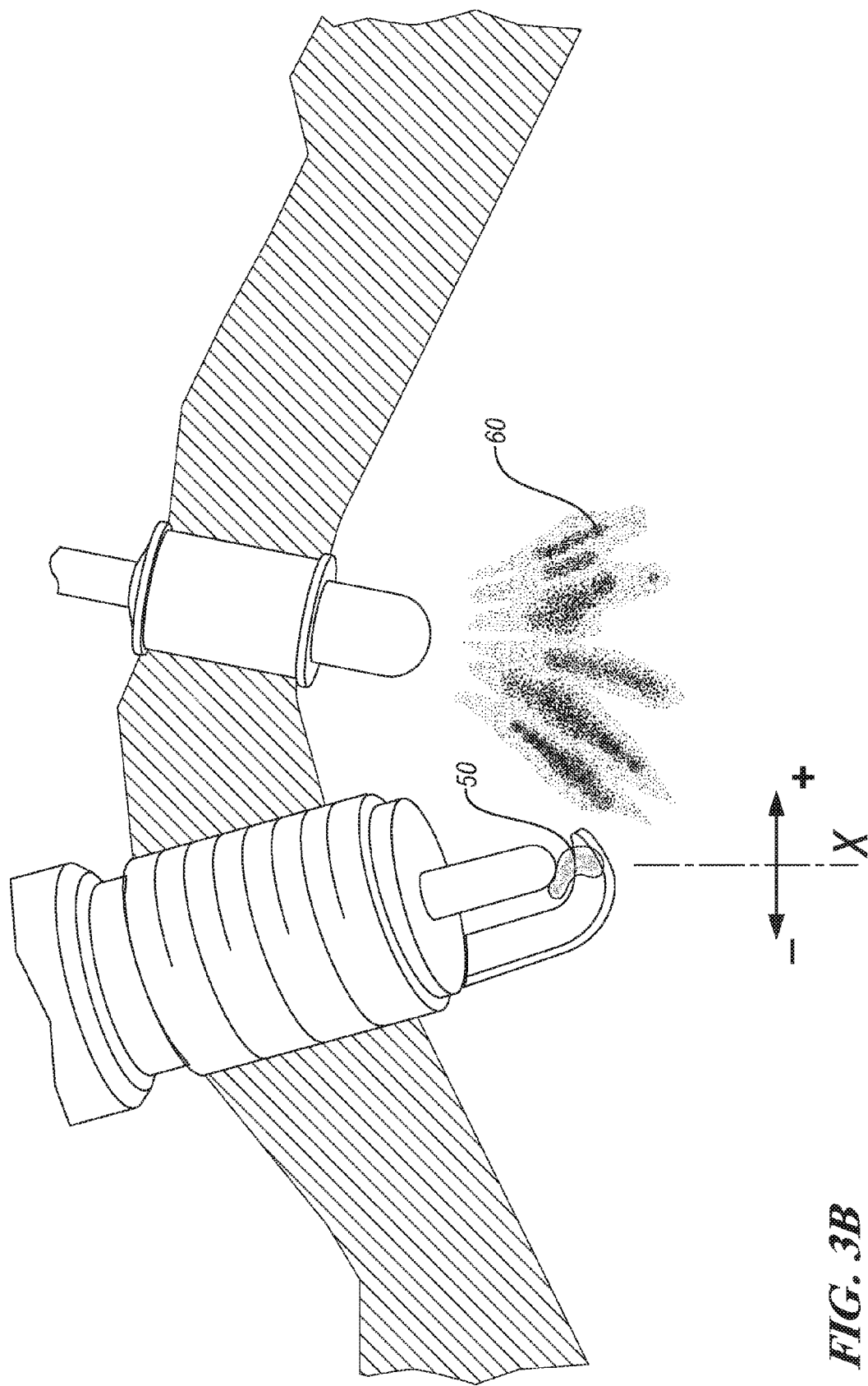
Figure 3C:
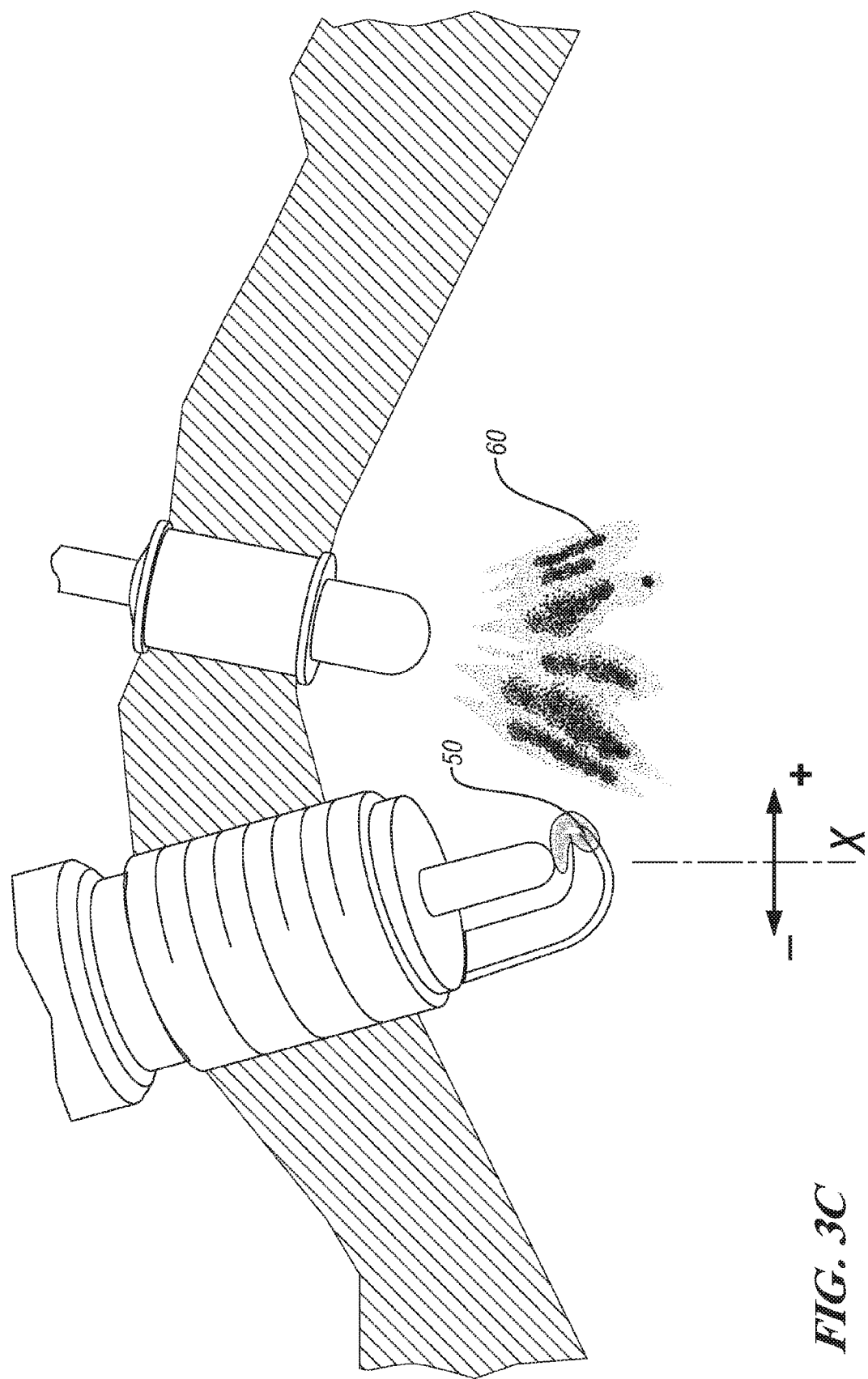
Figure 3D:
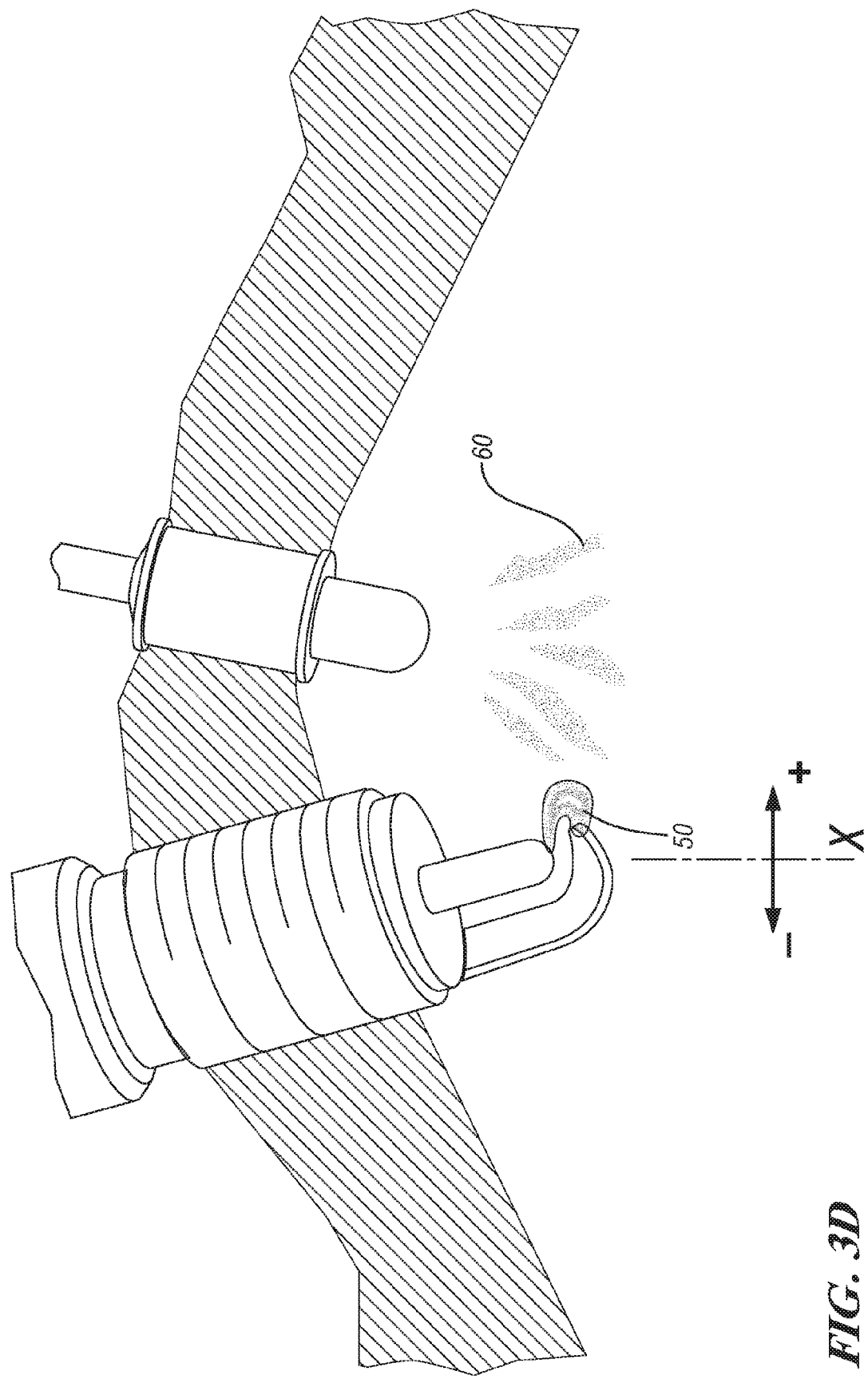

Referring now to FIGS. 3A-3D, further details are shown of the fuel injection system of FIG. 2, shown as four sketches which depict images captured within an exemplary cylinder constructed in accordance with the engine described with reference to FIG. 1. The images were captured using photographic equipment and techniques operative to visually record in-cylinder events during a single engine cycle. Locations of the spark plug cathode electrode and anode electrode have been enhanced and an X-scale has been added to facilitate linear measurement for more complete understanding. The X-scale includes a zero point concurrent a centerline formed by the spark plug cathode electrode 16, in order to demonstrate activity of interest within the combustion chamber 20. Movement and entrainment of the spark-discharge plasma channel by in-cylinder charge motion using direct fuel injection was recorded, and measured as a linear excursion along the X-axis away from the spark plug cathode electrode 16. In FIG. 3A, the spark plasma channel 50 begins on the left side of the center of the cathode electrode 16 and designated as a negative direction. In FIG. 3B, fuel injected during an injector spray event becomes visible, depicted as combustible charge 60, and begins to move the spark plasma channel 50 toward a positive X-direction. Movement and thus entrainment of the spark channel continues through FIG. 3C and the spark plasma channel 50 is seen to be drawn completely out of the spark plug gap by the end of the injection event, as depicted in FIG. 3D. The injected fuel disappears in FIG. 3D due to vaporization, leaving a fuel-air mixture into which the spark plasma channel 50 has been drawn.

Figure 4:
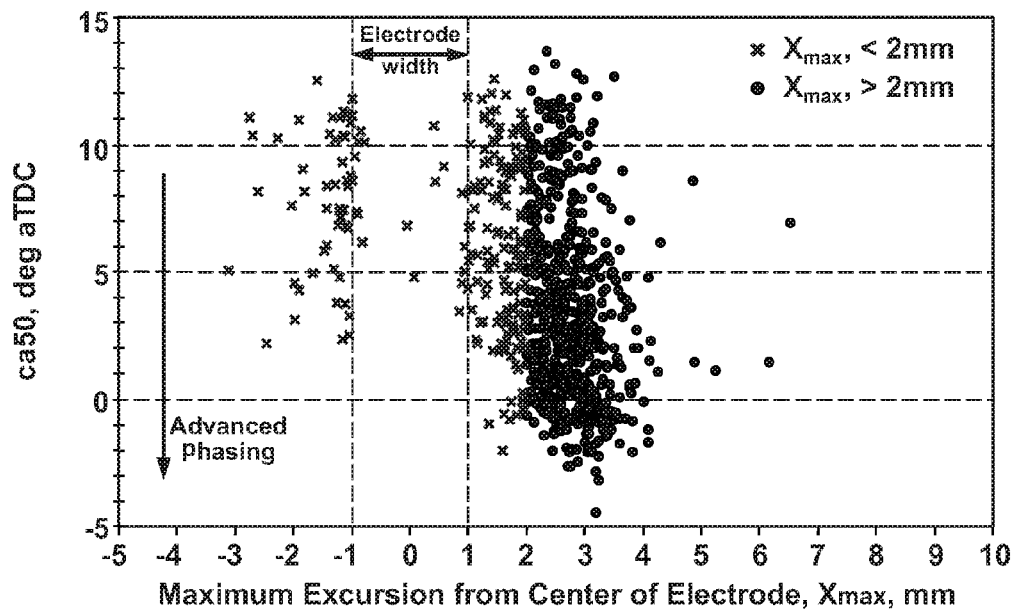
Figure 5:
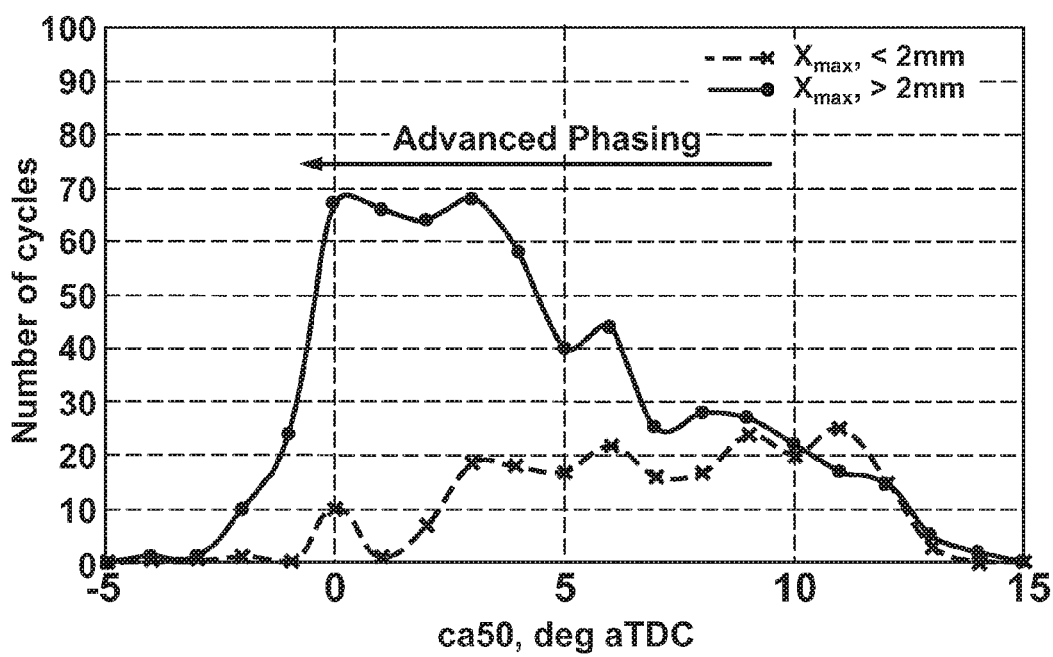

Referring now to FIGS. 4 and 5, two graphs are shown depicting the effect of spark-channel entrainment (illustrated in FIG. 3), caused by cylinder-charge motion using direct fuel-injection on controlled auto-ignition combustion phasing. The graph shown in FIG. 4 depicts the crank angle at fifty percent mass burned (ca50), measured in terms of degrees after top-dead-center (deg aTDC), as a function of maximum plasma excursion from the center of the electrode, in millimeters. Auto-ignition combustion phasing is defined as the crank angle at which 50 percent of the mass has burned (ca50). The data depicted as "x" are those cycles that experienced little entrainment by the spray and thus the maximum excursion, Xmax, was less than +2 mm from the center of the electrodes. The data depicted as "•" are those cycles with entrainment for which the maximum excursion, Xmax, was greater than +2 mm from the center of the electrodes. FIG. 5 comprises a graph showing the number of cycles achieving each crank angle at which fifty percent mass is burned (ca50) from the two cases delineated in FIG. 4; namely, the poorly entrained cycles (Xmax<2 mm) and highly entrained cycles (Xmax>2 mm). In particular, cycles with plasma-channel entrainment less than +2 mm had a low probability of advanced phasing. Plasma channels with Xmax>+2 mm had a high probability of advancing the auto-ignition combustion phasing to crank angle at which fifty percent mass is burned (ca50) prior to 5 deg aTDC. FIGS. 4 and 5 indicate that plasma-channel entrainment by fuel spray is a necessary but not sufficient condition for advanced auto-ignition combustion phasing.

Figure 6:
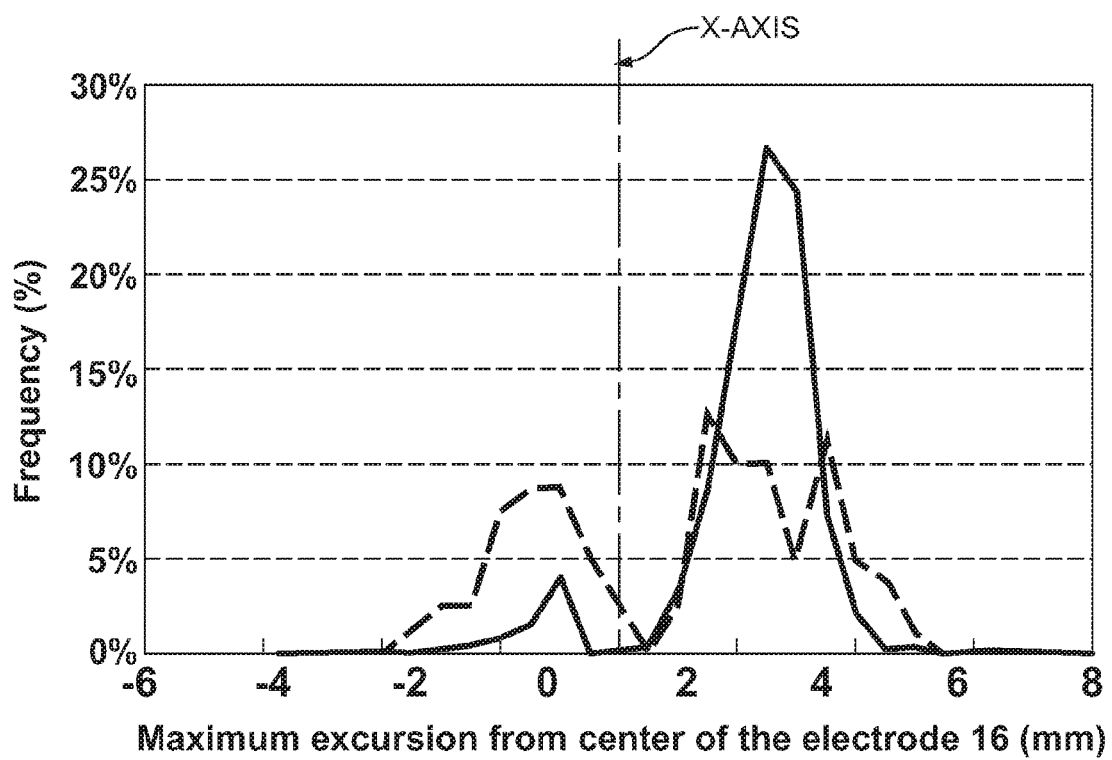

Referring now to FIG. 6, a graph depicting frequency of occurrence of maximum excursions from center of the electrode for a fired cylinder (i.e., fuel injected) and a motored cylinder (i.e., no fuel injection), is shown for 500 engine cycles. The results shown in FIG. 6 demonstrate that in-cylinder charge motion created by direct fuel injection increases the probability that the spark-discharge plasma channel 50 is moved and entrained in the positive X-direction. In particular, the maximum value of the plasma-channel excursion (in the X-direction) during each spark discharge has been computed from photographic images for the 500 engine cycles. The results depicted as the dashed line in FIG. 6 demonstrate that, in the motored engine with no fuel injection, the spark plasma channel 50 has a nearly equal probability to be moved in both the positive and the negative directions. This result occurs due to the in-cylinder charge motion generated by various flow-control parameters, including fresh intake air ingested through the intake port 17, residual gas flow, shape of the combustion-chamber 20, including the cylinder head 27 and top of the piston 11, and interaction of these flow-control parameters during intake and compression strokes. The flow control parameters and the direct injection of the fuel operate to control velocity and momentum of the in-cylinder charge motion. In contrast, the results depicted in FIG. 6 as a solid line demonstrate that during engine operation with direct fuel injection and auto-ignition combustion, the plasma channel is preferentially entrained by the fuel injection spray toward the positive X-direction.

In summary, the viability of the present embodiment is clearly demonstrated wherein, by optimizing both fuel injection timing and targeting, the spark-discharge plasma channel was entrained by the in-cylinder charge motion induced primarily by the fuel spray. The efficacy of the present embodiment was demonstrated in FIGS. 4-6 wherein it is demonstrated that the in-cylinder charge motion created by the direct fuel injection advanced the combustion phasing in a controlled auto-ignition combustion engine.

The present disclosure presents a method to manipulate the spark-discharge plasma channel with the in-cylinder flow for combustion control in the direct-injection controlled auto-ignition combustion engine. In particular, it offers method to control the auto-ignition combustion phasing. The combustion phasing is defined here as the timing in crank-angle degrees at which 50 percent of the mass is burned (ca50). Potential benefits of the present disclosure include: 1) improved individual cylinder combustion control during speed and load transients in a multi-cylinder engine and 2) relaxed the geometric constraints somewhat for better combustion system design. The present disclosure applies to controlled auto-ignition combustion engines operated with any single- or multi-component fuel. Benefits of the present disclosure include an improved individual cylinder combustion control during speed and load transient conditions, and more robust combustion system design related to geometric constraints.

The disclosure has described certain preferred embodiments and modifications thereto. This can include various engine configurations including a free-piston linear alternator, or a two-stroke crank-and-slider engine. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Powertrain, comprising:
an internal combustion engine, including a combustion chamber having an in-cylinder fuel injector and a spark-ignition device, said engine operative in a controlled auto-ignition combustion mode; and
a control module configured to control the spark ignition device to generate a spark-discharge plasma channel between cathode and anode electrodes of the spark ignition device, and
actuate the in-cylinder fuel injector to generate a combustible charge in the combustion chamber and generate fuel-spray-induced motion in the combustion chamber to draw the spark-discharge plasma channel toward the combustible charge to advance phasing of auto-ignition of the combustible charge.

2. The powertrain of claim 1, wherein the control module is configured to adjust one of magnitude and timing of openings of intake and exhaust valves of the combustion chamber to generate the fuel-spray-induced motion in the combustion chamber.

3. The powertrain of claim 1, further comprising the combustion chamber and the piston top designed to generate charge motion of the combustible charge in the combustion chamber to entrain the spark-discharge plasma channel, and the control module configured to actuate the in-cylinder fuel injector to generate the fuel-spray-induced motion in the combustion chamber to draw the entrained spark-discharge plasma channel toward the combustible charge to advance the phasing of auto-ignition of the combustible charge.

4. The powertrain of claim 1, wherein the control module configured to actuate the in-cylinder fuel injector to generate the combustible charge in the combustion chamber further comprises the control module configured to control timing to actuate the in-cylinder fuel injector.

5. The powertrain of claim 1, wherein the in-cylinder fuel injector is targeted to generate the combustible charge in the combustion chamber to move the spark-discharge plasma channel in the combustible charge to advance phasing of the controlled auto-ignition combustion.

6. The powertrain of claim 1, further comprising the control module configured to selectively actuate the in-cylinder fuel injector to generate the combustible charge in the combustion chamber and generate fuel-spray-induced motion in the combustion chamber to draw a portion of the spark-discharge plasma channel toward the combustible charge a lateral distance of at least two millimeters from a centerline formed by the cathode electrode of the spark ignition device.

7. The powertrain of claim 1, wherein the controlled auto-ignition internal combustion engine comprises a homogeneous-charge, compression-ignition engine.

8. The powertrain of claim 1, wherein the controlled auto-ignition internal combustion engine comprises a stratified-charge engine.

9. Method to control combustion in a homogeneous-charge, direct-injection, controlled auto-ignition internal combustion engine, comprising:

creating a spark-discharge plasma channel between electrodes of a spark plug; and controlling the spark-discharge plasma channel by controlling an in-cylinder combustion charge, including controlling timing and targeting of fuel injection from an in-cylinder fuel injector to generate the combustion charge in the combustion chamber and generating fuel-spray-induced motion in the combustion chamber to draw the spark-discharge plasma channel toward the combustion charge to advance phasing of auto-ignition of the combustion charge.

* * * * *